Jan. 1, 1963     B. B. LATTER     3,071,719
MOTOR PROTECTION CIRCUIT
Filed April 28, 1961
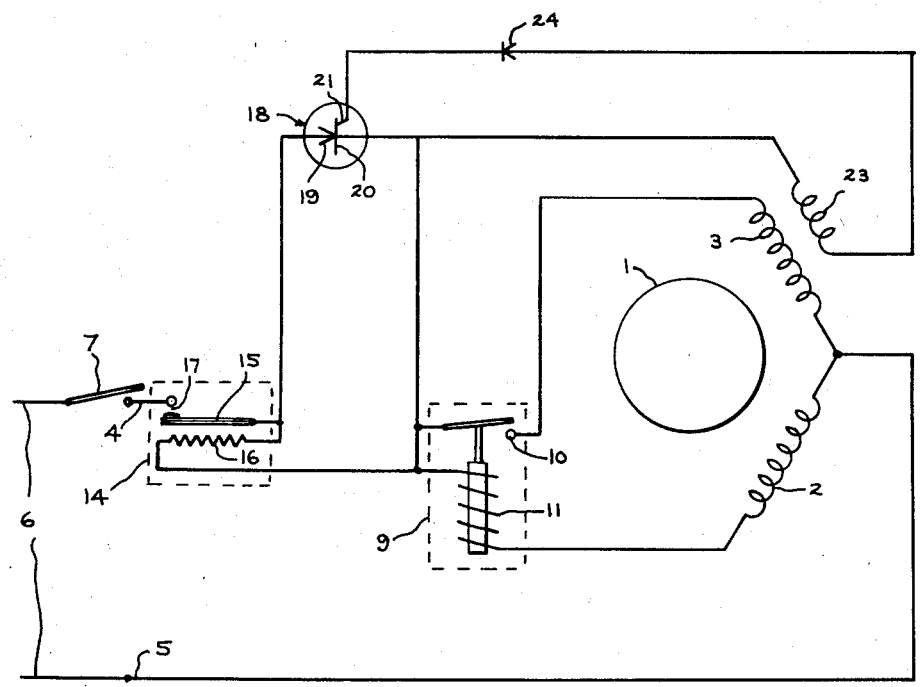
INVENTOR.
BRUCE B. LATTER
BY *Walter E. Rule*
HIS ATTORNEY

United States Patent Office 3,071,719
Patented Jan. 1, 1963

3,071,719
MOTOR PROTECTION CIRCUIT
Bruce B. Latter, Anchorage, Ky., assignor to General
Electric Company, a corporation of New York
Filed Apr. 28, 1961, Ser. No. 106,351
3 Claims. (Cl. 318—473)

The present invention relates to a motor protection circuit and is more particularly concerned with a new and improved circuit for thermally protecting an alternating current motor.

In order to protect electric motor windings from damage due to overheating under either stalled rotor or overload operating conditions, it is a common practice to provide a thermally actuated switch arranged to sense the temperature of the motor and to open when the temperature sensed by the switch exceeds a predetermined limit. Such a switch may also include a resistance heater in series with the motor windings so that the switch will be responsive either to an excessive current flowing to the motor winding or to the gradual accumulation of heat in the motor. One problem involved in the application of such a thermal switch means for the protection of some motors, for example single phase motors, results from the fact that such motors draw a high operating current and while the heating effect of this current on the windings is normally dissipated from the motor by suitable cooling means operated by the motor rotor so that the motor is not damaged thereby, the operating current may be much higher than that which could be tolerated without damage to the motor under stalled rotor conditions. Thus, it is desirable that motors of this type be provided with a thermal overload protector which will trip and de-energize the motor at a much lower setting for non-running conditions than for motor operating conditions.

It is an object of the present invention to provide a motor protection circuit which permits a higher current to be supplied to the motor winding when the motor is operating than when the motor is stalled.

Another object of the invention is to provide a motor protection circuit which permits the flow of a relatively high operating current to the motor under running conditions but which interrupts the flow of current to the motor at a lower current flow under non-running or stalled conditions.

A further object of the invention is to provide a motor protection circuit including a thermally actuated switch including a resistance heater in series with the motor winding and improved means for partially shunting the heater when the motor is operating so that a higher current can be supplied to the motor during running conditions than during non-running conditions without tripping or opening the switch.

Further objects and advantages of the invention will become apparent as the following description proceeds and the features of novelty which characterize the invention will be pointed out with particularity in the claims annexed to and forming a part of this specification.

In accordance with the present invention there is provided an electric motor comprising a rotor and motor windings, including a run winding, and normally closed thermally actuated switch means for interrupting the flow of current to the motor windings whenever the motor temperature or current flow are such as to cause possible damage to the motor windings. For this purpose the thermally actuated switch means is arranged to be responsive to the motor temperature and also includes a resistance heater connected in series with the run winding so that it is heated both by the motor and by the current flowing to the motor. In order to prevent the current flowing to the motor during normal operation thereof from opening the switch, means are provided for partially shunting the resistance heater when the motor is operating and in accordance with the present invention this partial shunting means comprises a silicon controlled rectifier connected across the resistance heater and adapted to be fired and thereby rendered conducting by a control signal generated in an auxiliary motor winding adapted to have a voltage induced therein by and during rotation of the rotor.

For a better understanding of the invention reference may be had to the accompanying drawing in which the single FIGURE is a wiring diagram of a single phase motor embodying the protective circuitry of the present invention.

Referring to the drawing, there is shown a single phase electric motor comprising a rotor 1, a run winding 2 and a start winding 3. These windings are arranged to be connected in parallel through leads 4 and 5 to a source of alternating current power supply 6. A control switch 7 in one of the lead lines 4 or 5 is provided for turning the motor on or off. In accordance with the usual practice, the start winding 3 is constructed or arranged within the motor that it is displaced in phase or spacing from the run winding 2 in order to provide the torque required to start a single phase motor. Once a motor of this type has approached or has reached its normal operating speed, the start winding is preferably removed from the motor circuit. In the illustrated embodiment of the invention, this is accomplished by means of a starting circuit relay 9 including normally open starting contacts 10 and an operating coil 11 arranged in series with the run winding 2. When the motor is first energized there is a high surge of current through the running windings so that the coil 11 is energized sufficient to close the starting contacts 10 so that the start winding is also energized. As the motor approaches its desired operating speed, the impedance of the run winding circuit increases so that the current drawn thereby is reduced whereupon the coil 11 is insufficiently energized to hold the contacts 10 closed. The contacts will then open to remove the start winding from the motor circuit.

In order to protect the motor from overheat conditions, whether resulting from an accumulation of heat within the motor or from a high current flow to the motor under stalled rotor conditions, there is provided a thermally actuated switch means 14 including a bimetal switch element 15 and a resistance heater 16 in heating relationship with the bimetal switch. This thermal switch means 14 having normally closed contacts 17 actuated by the bimetal element is normally positioned on or adjacent the motor casing so that it will be responsive to the motor temperature. Also in order that the normally closed contacts 17 will open under high current flow conditions, a resistance heater 16 in heating relation with the bimetal element is connected in series with the motor windings 2 and 3.

In order to provide the desired overload protection and at the same time not interfere with the energization of motor during the starting period, the thermal switch means 14 is so designed that the amount of heat given off by the resistance heater 16 during the brief period of high current flow during initial starting of the motor will be insufficient to expand the bimetal 15 and open the switch contacts 17.

However, in order to protect the motor under stalled conditions and yet permit the flow of a relatively high current to the motor during normal operation thereof, it is desirable that the thermal switch means will be capable of opening the circuit at a lower current setting for non-running conditions than for running conditions. In accordance with the present invention, this objective is accomplished by means of a silicon controlled rectifier 18 connected across the resistance heater 16 and adapted to partially shunt the resistance and hence decrease its heat output during normal motor operations.

The silicon controlled rectifier 18 employed in the practice of the present invention is a solid state transistor-like device having an anode 19, a cathode 20 and a gating electrode or element 21. A rectifier of this type blocks the flow of alternating current in both directions until a small but significant signal is applied to the gating element 21 whereupon current is conducted through the rectifier in one direction. In direct current applications, the gating element thereafter loses control over electric conduction through the anode and cathode and conduction will continue as long as power is supplied to the rectifier through the anode and cathode electrodes. However, in alternating current applications, the current through the silicon controlled rectifier is turned off or commutated by the reversal of the line voltage during each half cycle and since the turn-off time is in the order of 25 microseconds or less, the rectifier will turn off every half cycle for ordinary power supply frequencies and will then remain nonconducting unless a gating signal is continuously or repetitively supplied to the gating element. For a more detailed description of silicon controlled rectifiers, reference is made to the publication "Controlled Rectifier Manual," first edition, published by the General Electric Company, Semiconductor Products Department, Auburn, New York (copyright 1960).

With the silicon controlled rectifier 18 across or in parallel with the heater 16, the rectifier, when rendered conducting, will partially shunt the resistance 16 and thereby decrease the current flow through that resistance upon the application of a suitable gating signal to the gating element 21. In order to render the rectifier 18 conductive only when the motor is operating and thereby decrease the effective current flow through the resistance 16 under these conditions, means are provided for supplying a gating signal to the rectifier 18 when the motor is running. This signal supply means comprises an auxiliary winding 23 in the motor connected in series with the gating element 21 and the cathode 20 so that the voltage generated in the auxiliary winding by rotation of the rotor 1 will fire the rectifier 18 and render the rectifier conducing over approximately ½ of each cycle. This, in effect, provides a partial shunt around the heater 16 and in effect "up rates" thermal protector 14 for motor running conditions. A diode rectifier 24 provided in the signal circuit including the auxiliary winding 23 rectifies the current supplied to the gating element 21 and eliminates the application of a negative signal to that element.

Since a pulsating signal is repetitively supplied from the auxiliary winding 23 through the diode, the rectifier is maintained conductive whenever the rotor is rotating at a speed sufficient to supply a signal of the magnitude required to fire the rectifier. However, under stalled or substantially stalled rotor conditions, the signal supplied by the auxiliary winding 23 will be insufficient to fire the rectifier 18. The rectifier then becomes non-conducting so that the resistance heater 16 is no longer partially shunted. It will then be forced to carry the full current flowing to the motor windings with the result that sufficient heat will be supplied to the bimetal switch 15 to open the contacts 17 and disconnect the motor from the power source 6.

While the invention has been described with reference to a particular embodiment thereof, it will be understood that modifications may be made by those skilled in the art without actually departing from the invention. It is therefore intended in the appended claims to cover all such variations as come within the true spirit and scope of the invention.

What I claim as new and desire to secure by Letters Patent of the United States is:

1. In combination, an electric motor having a rotor and a run winding, a thermal overload protector switch including normally closed contacts and a resistance heater for heating said switch, connecting means for connecting said switch contacts, said resistance heater and said winding in series connection to a power supply line whereby said switch is heated by the current flowing to said winding, and means for decreasing the heating effect of said current when said rotor is rotating comprising a silicon controlled rectifier connected across said resistance heater and an auxiliary winding in said motor and adapted to have a voltage induced therein by rotation of said rotor, said rectifier including a gate element, said element being connected to said auxiliary winding whereby the voltage induced in said auxiliary winding during rotation of said rotor fires said rectifier to provide a partial shunt around said resistance heater when said motor is running.

2. In combination, an electric motor having a rotor and a run winding, a thermally actuated switch including normally closed contacts and a resistance heater for said switch, said switch being positioned to be responsive to the temperature of said motor, connecting means for connecting said switch contacts, said resistance heater and said winding in series connection to a power supply line whereby said switch is also affected by the current flowing to said winding, and means for biasing said switch so that it will be opened by a lower current flow when said rotor is not rotating than when said rotor is running comprising a silicon controlled rectifier connected across said resistance heater and an auxiliary winding in said motor and adapted to have a voltage induced therein by rotation of said rotor, said rectifier including a gate element, said element being connected to said auxiliary winding whereby the voltage induced in said auxiliary winding during rotation of said rotor fires said rectifier to provide a partial shunt around said resistance heater and thereby decreases the heating effect of the current flowing to said run winding on said thermal switch.

3. In combination, an electric motor having a rotor and a run winding, a thermally actuated switch including normally closed contacts and a resistance heater for said switch, said switch being positioned to be responsive to the temperature of said motor, connecting means for connecting said switch contacts, said resistance heater and said winding in series connection to a power supply line whereby said switch is also affected by the current flowing to said winding, and means for partially shunting said resistance heater when said motor is running so that said switch will be opened by a lower current flow when said rotor is not rotating than when said rotor is running comprising a silicon controlled rectifier connected in parallel with said resistance heater and an auxiliary winding arranged in said motor to have a voltage induced therein only upon rotation of said rotor, said rectifier including a gate element, said element being connected to said auxiliary winding whereby the voltage induced in said auxiliary winding during rotation of said rotor causes said rectifier to become conducting.

No references cited.